United States Patent
Sudo

(10) Patent No.: US 6,937,557 B1
(45) Date of Patent: Aug. 30, 2005

(54) OFDM COMMUNICATION APPARATUS

(75) Inventor: Hiroaki Sudo, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 888 days.

(21) Appl. No.: 09/806,412

(22) PCT Filed: Aug. 22, 2000

(86) PCT No.: PCT/JP00/05597

§ 371 (c)(1),
(2), (4) Date: Mar. 30, 2001

(87) PCT Pub. No.: WO01/17148

PCT Pub. Date: Mar. 8, 2001

(30) Foreign Application Priority Data

Aug. 27, 1999 (JP) ................................ 11-240878

(51) Int. Cl.[7] ............................................. H04J 11/00
(52) U.S. Cl. ..................... 370/203; 370/282; 370/310; 455/7
(58) Field of Search ................... 370/203–211, 276, 370/282, 310; 455/39, 42, 45, 63, 66, 504, 455/509, 510, 7

(56) References Cited

U.S. PATENT DOCUMENTS

| | | | | |
|---|---|---|---|---|
| 5,507,035 A | * | 4/1996 | Bantz et al. | .............. 455/133 |
| 5,799,245 A | * | 8/1998 | Ohashi | .................. 455/69 |
| 5,970,061 A | * | 10/1999 | Kokudo | ................. 370/344 |
| 6,005,876 A | * | 12/1999 | Cimini et al. | ............... 370/525 |
| 6,006,075 A | * | 12/1999 | Smith et al. | ................ 455/101 |
| 6,131,016 A | * | 10/2000 | Greenstein et al. | ........... 455/69 |
| 6,747,948 B1 | * | 6/2004 | Sarraf et al. | ................ 370/210 |

FOREIGN PATENT DOCUMENTS

| | | |
|---|---|---|
| EP | 740430 | 10/1996 |
| JP | 11205205 | 7/1999 |

OTHER PUBLICATIONS

PCT International Search Report dated Nov. 14, 2000.
Yoichi Matsumoto et al., "OFDM Subchannel Space-Combining Transmission Diversity (SC-TD) for TDMA-TDD Broadband Wireless Access Systems." NTT Wireless Systems Laboratories. 1998, B-5-16, p. 380.

* cited by examiner

*Primary Examiner*—Nassan Kizou
*Assistant Examiner*—Dmitry Levitan
(74) *Attorney, Agent, or Firm*—Stevens, Davis, Miller & Mosher, LLP

(57) ABSTRACT

An OFDM communication apparatus comprises subcarrier selecting means for selecting subcarriers to be transmitted for each branch in accordance with the number of retransmissions of transmitting signals and transmitting means for providing TIFFT processing to transmitting signals arranged in said subcarriers for each branch to transmit the resultant.

6 Claims, 7 Drawing Sheets

OFDM COMMUNICATION APPARATUS

1. Technical Field

The present invention relates to an OFDM (Orthogonal Frequency Division Multiplexing) communication apparatus that performs transmission diversity, and particularly to an OFDM communication apparatus that performs retransmission control.

2. Background Art

The conventional OFDM communication apparatus that performs transmission diversity will be explained with reference to FIG. 1. FIG. 1 is a block diagram illustrating the configuration of a base station apparatus comprising the conventional OFDM communication apparatus that performs transmission diversity. It is noted that FIG. 1 shows the configuration on the assumption that the number of branches is 2.

Regarding retransmission control at the base station apparatus having the conventional OFDM communication apparatus that performs transmission diversity, the explanation as an example is given of the case in which this base station apparatus performs radio communication with a mobile station apparatus having the configuration as illustrated in FIG. 2. FIG. 2 is a block diagram illustrating the configuration of the mobile station apparatus that performs radio communication with the base station apparatus having the conventional OFDM communication apparatus that performs transmission diversity. The following will explain the case in which the base station apparatus transmits a signal to the mobile station and an error is present in the signal transmitted by the base station apparatus, in which case the base station retransmits the error signal to the mobile station.

The signal transmitted by the mobile station apparatus illustrated in FIG. 2 is received by the base station apparatus illustrated in FIG. 1. Referring to FIG. 1, in the receiving system, the signals (received signals) through an antenna 16 and an antenna 17, namely the received signal from a branch 1 and the received signal from branch 2 are subjected to FFT (Fast-Fourier-transform) processing by an FFT section 18 and an FFT section 19. Signals arranged to the respective subcarriers at branches 1 and 2 are outputted to a reception diversity section 20 from an FFT section 18 and an FFT section 19.

The reception diversity section 20 provides reception diversity processing to the signals arranged to the respective subcarriers at the branches 1 and 2. Regarding this reception diversity processing, the reception diversity section 20 selects a received signal with a high reception level at the branch for each signal of each subcarrier or combines received signals at the respective branches.

A demodulating/error correcting section 21 provides demodulation processing and error correction processing to the signal subjected to reception diversity processing. The signal subjected to demodulation processing and error correction processing is sent to a retransmission control section 11. In the case where no error is present in the signal subjected to demodulation processing and error correction processing at the retransmission control section 11, this signal is outputted as a received signal.

On other hand, in the transmitting system, a transmitting signal is stored in the retransmission control section 11. This transmitting signal is a signal in packet unit. The transmitting signal stored is transmitted to a coding/modulating section 12 from the retransmission control section 11 in accordance with transmission timing.

The coding/modulating section 12 provides code processing and modulation processing to the signal transmitted from the retransmission control section 11. The signal subjected to code processing and modulation processing is sent to a transmitting subcarrier selecting section 13.

By the way, the base station apparatus can normally perform the transmission diversity when performing TDD communication with the mobile station apparatus. Namely, the base station apparatus selects a signal to be transmitted for each branch based on the selection result done by the reception diversity section 20 from among the signals arranged to the respective subcarriers.

However, in the case where the time interval between a reverse link and a forward link is long or the transmitting signal is concurrently received by a plurality of users (mobile stations) as in multicast communications, it is difficult for the base station apparatus to perform the above-mentioned transmission diversity.

For this reason, in the aforementioned case, the base station apparatus fixedly transmits the signals arranged to the respective subcarriers from any one of branches. Namely, in the aforementioned case, the following processing is provided at the transmitting subcarrier selecting section 13.

More specifically, the transmitting subcarrier selecting section 13 selects subcarriers to be fixedly transmitted for each branch. For example, as subcarriers to be transmitted with respect to the branch 1, odd-numbered subcarriers are fixedly selected as illustrated in FIG. 3A. Moreover, as subcarriers to be transmitted with respect to the branch 2, even-numbered subcarriers are fixedly selected as illustrated in FIG. 3B.

Thereafter, among the signals transmitted from coding/modulating section 12, only the signal to be arranged to the subcarriers to be transmitted with respect to the branch 1 is outputted to an IFFT section 14 from the transmitting subcarrier selecting section 13. Moreover, among the signals transmitted from coding/modulating section 12, only the signal to be arranged to the subcarriers to be transmitted with respect to the branch 2 is outputted to an IFFT section 15 from the transmitting subcarrier selecting section 13.

The IFFT section 14 and IFFT section 15 provide IFFT (Inverse-Fast-Fourier-Transform) processing to the signals from the transmitting subcarrier selecting section 13 respectively. The signals subjected to IFFT processing by the IFFT section 14 and IFFT section 15 are transmitted to the mobile station apparatus via the antenna 16 and antenna 17 respectively.

In a mobile station apparatus (FIG. 2), a signal received from an antenna 34 is subjected to FFT processing by an FFT section 35. A demodulating/error correcting section 36 provides demodulation processing and error correction processing to the signal subjected to FFT processing, and the resultant is outputted to a retransmission control section 31.

In the case where no error is present in the signal subjected to demodulation processing and error correction processing at the retransmission control section 31, the signal is outputted as a received signal. Conversely, in the case where an error is present in the signal subjected to demodulation processing and error correction processing, this signal is stored onto a given memory.

In the case where an error is present in the signal subjected to demodulation processing and error correction processing, transmission including a packet that requests the base station apparatus of the retransmission of this signal is subjected to code processing/modulation processing by a coding/modulating section 32, and is further subjected to IFFT processing by an IFFT section 33, and then the resultant is transmitted to the base station apparatus via the antenna 34.

Thereafter, in the base station apparatus (FIG. 1), a packet subjected to a request for retransmission by the mobile station apparatus is transmitted to the coding/modulating section 12 at the retransmission control section 11 in accordance with retransmission timing. This packet is subjected to the same processing as mentioned above, and is retransmitted to the mobile station apparatus via the antenna 16 and antenna 17.

Thus, the signal having an error in the mobile station apparatus is retransmitted to the base station apparatus.

However, in the conventional OFDM communication apparatus that performs the transmission diversity, there is a problem set forth below.

More specifically, in the aforementioned mobile station apparatus, circumstances may be generated where poor-quality signals are intensively input for a certain specific time as signals that will be subjected to error correction processing.

In order to explain the above circumstances, FIG. 4 is used. FIG. 4 is a schematic view illustrating one example of arrangements of subcarriers in connection with the signal received by the mobile station apparatus that performs radio communication with the base station apparatus having the conventional OFDM transmission diversity. It is noted that the transmission subcarrier selecting section 13 of the base station apparatus performs the selection of subcarriers to be transmitted as mentioned above.

When the signals where subcarriers are arranged as illustrated in FIG. 4 is received by the mobile station apparatus (FIG. 2), the signals, which are outputted from the FFT section 35, are those extracted from the respective subcarriers on the time series in order of subcarriers 1, 2, 3, 4 . . . As is obvious from FIG. 4, the quality of the signals arranged in the respective subcarriers 1 to 4 becomes worse.

As a result, regarding the signals inputted to the modulating/correcting section 36, since poor-quality signals are intensively input for a certain specific time, the effect obtained from error correction processing is reduced and the signals having errors are frequently outputted to the retransmission control section 31. As a result, the base station apparatus retransmits the same packet.

Moreover, in the case where the fluctuation in the channel (transmission path) state is slower than the time interval at which the base station apparatus transmits the same packet, the channel state in which the same packet is first transmitted and the channel state in which the same packet is retransmitted are substantially the same as each other.

In this case, at the time of receiving the signal including the retransmitted packet by the mobile station apparatus, the state of arrangement of subcarriers in the received signal is substantially the same as the state illustrated in FIG. 4. For this reason, regarding the packet retransmitted by the base station apparatus, possibility that an error will occur is extremely increased at the mobile station apparatus, and this causes a problem in which an error occurs continuously in the packet. Accordingly, it takes much time till the mobile station apparatus receives a certain specific packet without failure that is transmitted by the base station apparatus.

DISCLOSURE OF INVENTION

It is an object of the present invention is to provide an OFDM communication apparatus that performs transmission diversity capable of reducing a probability that errors continuously occur in the same transmitting signal.

The above object can be attained by changing subcarriers to be transmitted for each branch in accordance with the number of retransmissions of transmitting signal.

BEST MODE FOR CARRYING OUT THE INVENTION

The best mode for carrying out the present invention will be specifically explained with reference to the drawings. Regarding an OFDM communication apparatus that performs transmission diversity according to the present invention, the embodiment set forth below gives an explanation of the case as an example in which this OFDM communication apparatus is mounted on the base station apparatus. However, the OFDM communication apparatus that performs transmission diversity according to the present invention is mountable on a communication terminal apparatus.

EMBODIMENT

Figure 5:
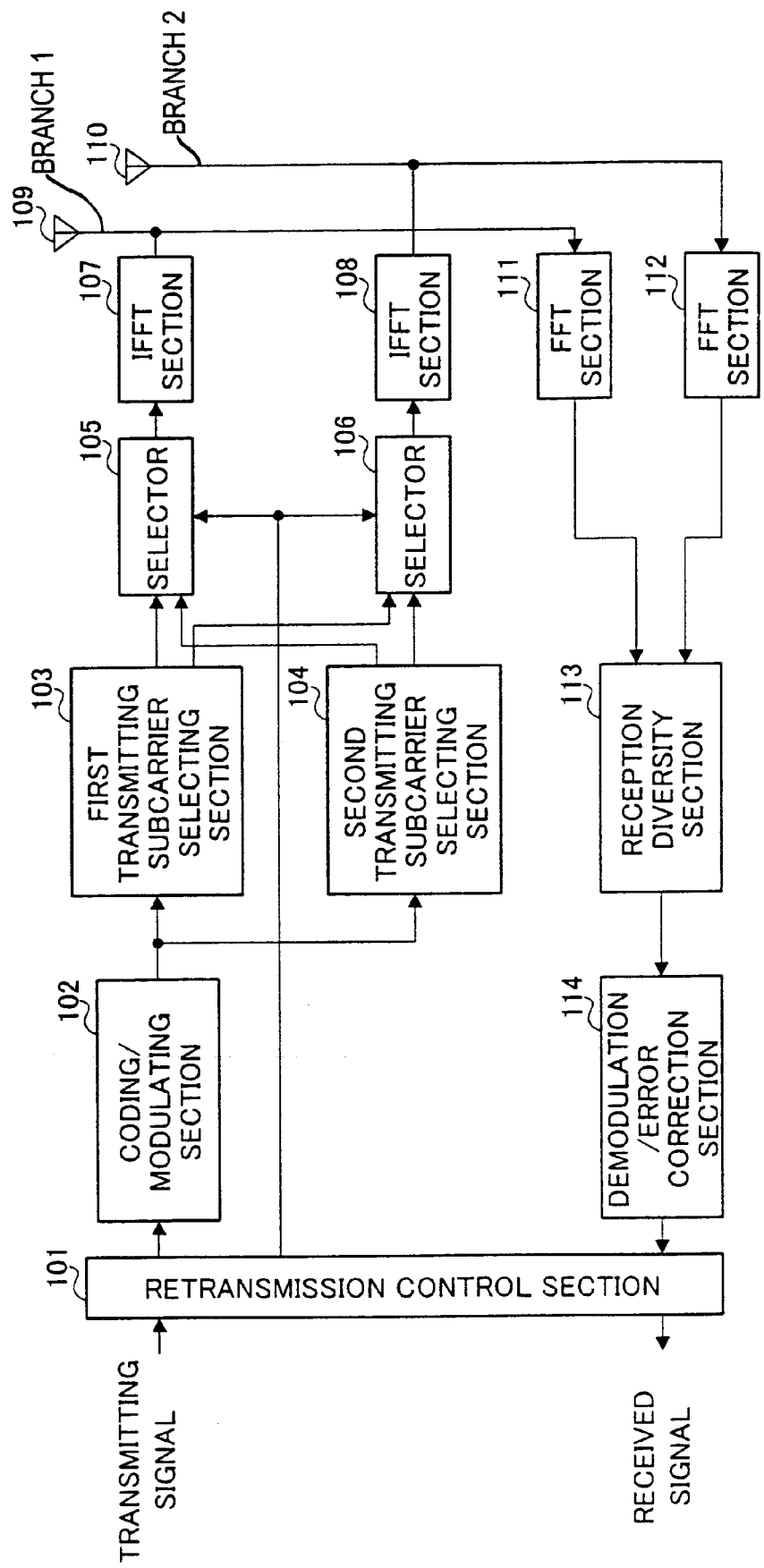
FIG. 5 is a block diagram illustrating the configuration of a base station apparatus having an OFDM communication apparatus that performs transmission diversity according to an embodiment of the present invention.

FIG. 5 is a block diagram illustrating the configuration of a base station apparatus having an OFDM communication apparatus that performs transmission diversity according to an embodiment of the present invention. Though FIG. 5 shows the case in which the number of branches is 2, the number of branches is not limited.

Regarding the retransmission control using the base station apparatus having the OFDM communication apparatus that performs transmission diversity according to an embodiment of the present invention (hereinafter simply referred to as "base station apparatus"), an explanation is given of the case as an example in which the base station apparatus performs radio communication with the mobile station apparatus. The following will explain the case in which the base station apparatus transmits a signal to the mobile station and an error is present in the signal transmitted by the base station apparatus, in which case the base station transmits again (retransmits) the error signal to the mobile station. It is noted that the configuration illustrated in FIG. 2 makes the mobile station apparatus implementable.

Figure 1:
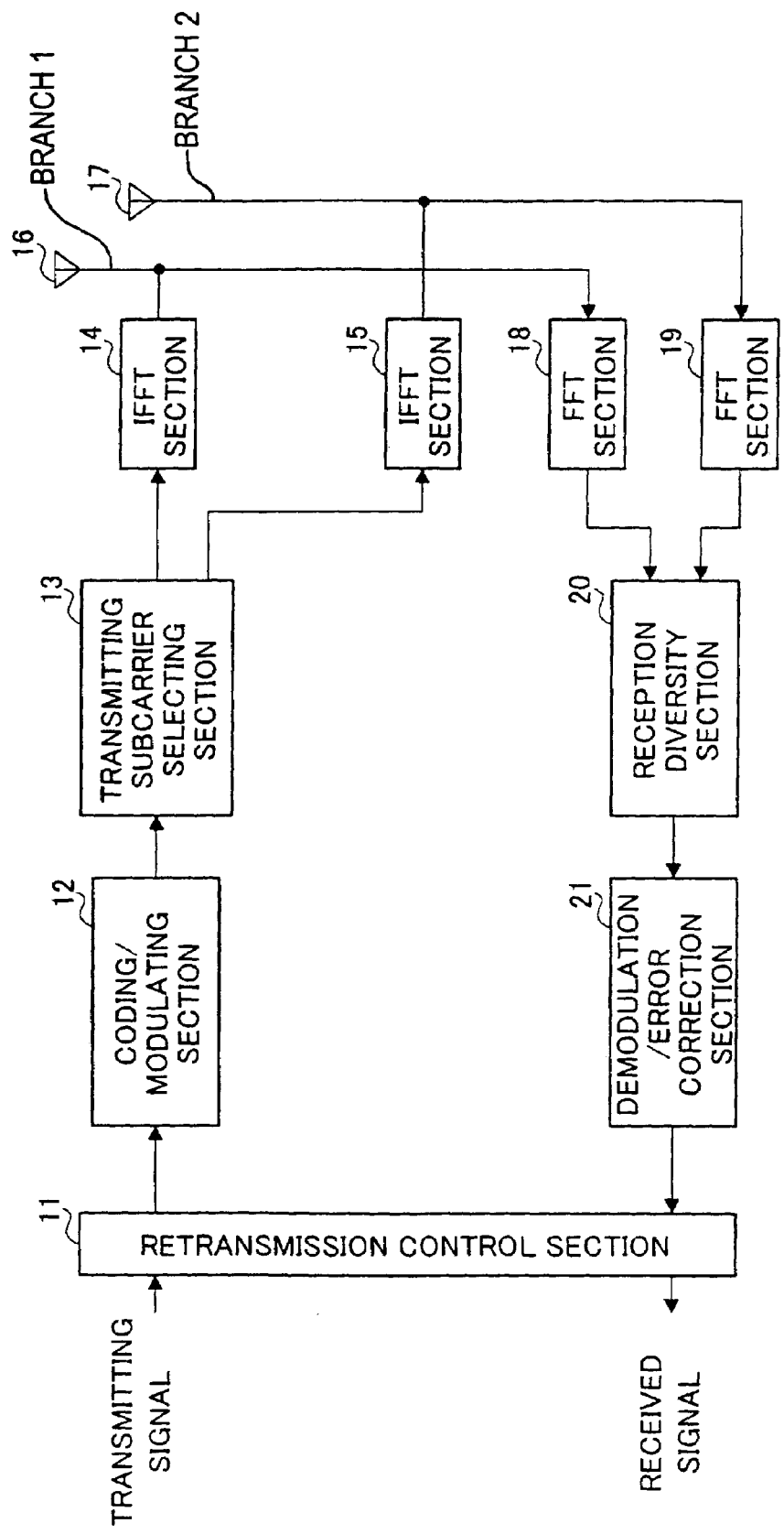
FIG. 1 is a block diagram illustrating the configuration of a base station apparatus having a conventional OFDM communication apparatus that performs transmission diversity.
Figure 2:
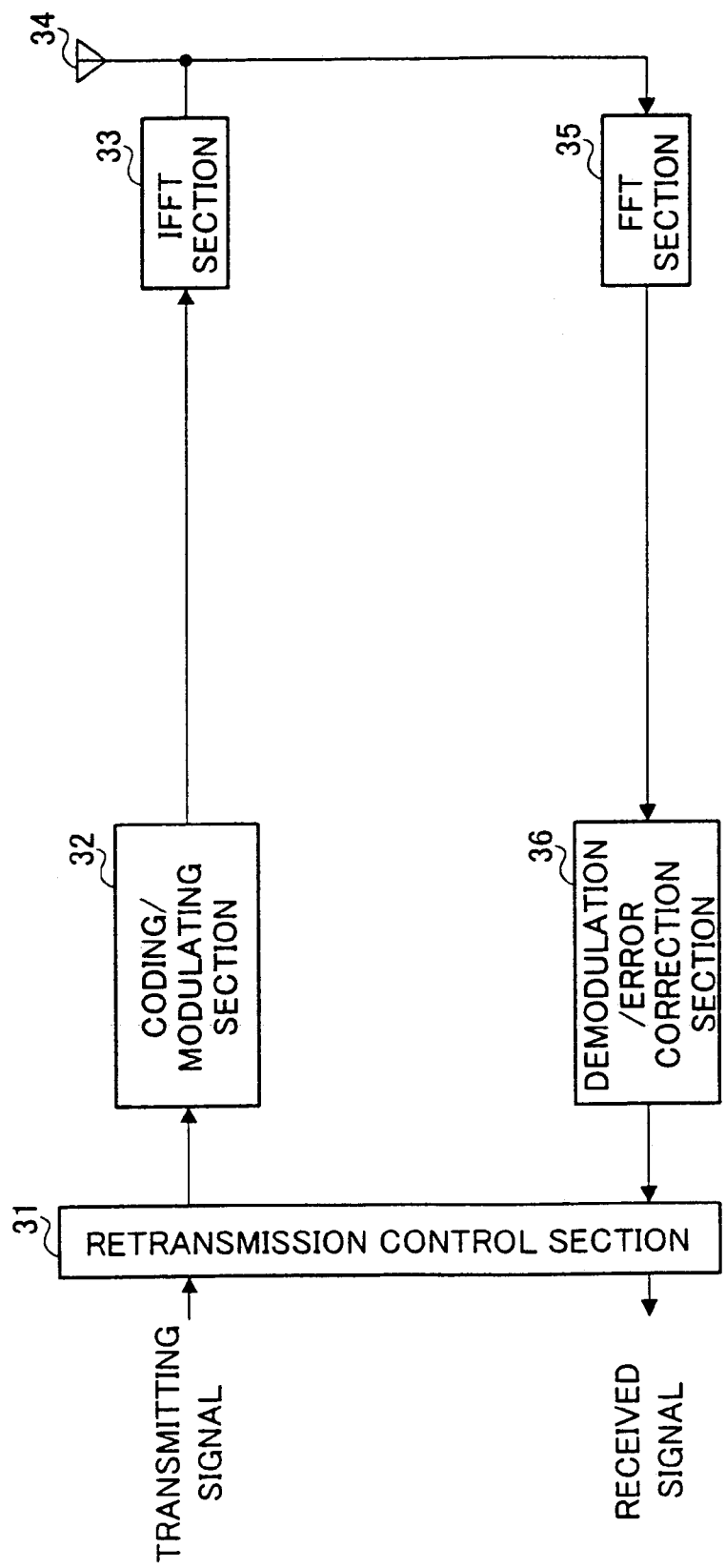
FIG. 2 is a block diagram illustrating the configuration of a mobile station apparatus that performs radio communication with the conventional base station apparatus of FIG. 1.

The signal transmitted by the mobile station apparatus illustrated in FIG. 2 is received by the base station apparatus illustrated in FIG. 5. Referring to FIG. 5, in the receiving system, the signals (received signals) through an antenna 109 and an antenna 110, namely the received signal from a branch 1 and the received signal from branch 2 are subjected to FFT processing by an FFT section 111 and an FFT section 112. Signals arranged to the respective subcarriers at branches 1 and 2 are outputted to a reception diversity section 113 from FFT section 111 and FFT section 113.

The reception diversity section 113 provides reception diversity processing to the signals arranged to the respective subcarriers at the branches 1 and 2. Regarding this reception diversity processing, the reception diversity section 113 selects a received signal with a high reception level at the branch for each signal of each subcarrier or combines received signals at the respective branches.

A demodulating/error correcting section 114 provides demodulation processing and error correction processing to the signal subjected to reception diversity processing. The signal subjected to demodulation processing and error correction processing is sent to a retransmission control section 101. In the case where no error is present in the signal subjected to demodulation processing and error correction processing at the retransmission control section 101, this signal is outputted as a received signal.

On other hand, in the transmitting system, a transmitting signal is stored in the retransmission control section 101. This transmitting signal is a signal in packet unit. The transmitting signal stored or the transmitting signal of packet unit subjected to a request for retransmission by the mobile station apparatus is transmitted to a coding/modulating section 102 from the retransmission control section 101 in accordance with transmission timing or retransmission timing.

The coding/modulating section 102 provides code processing and modulation processing to the signal transmitted from the retransmission control section 101. The signal subjected to code processing and modulation processing is sent to a first transmitting subcarrier selecting section 103 and a second transmitting subcarrier selecting section 104.

Figure 3:
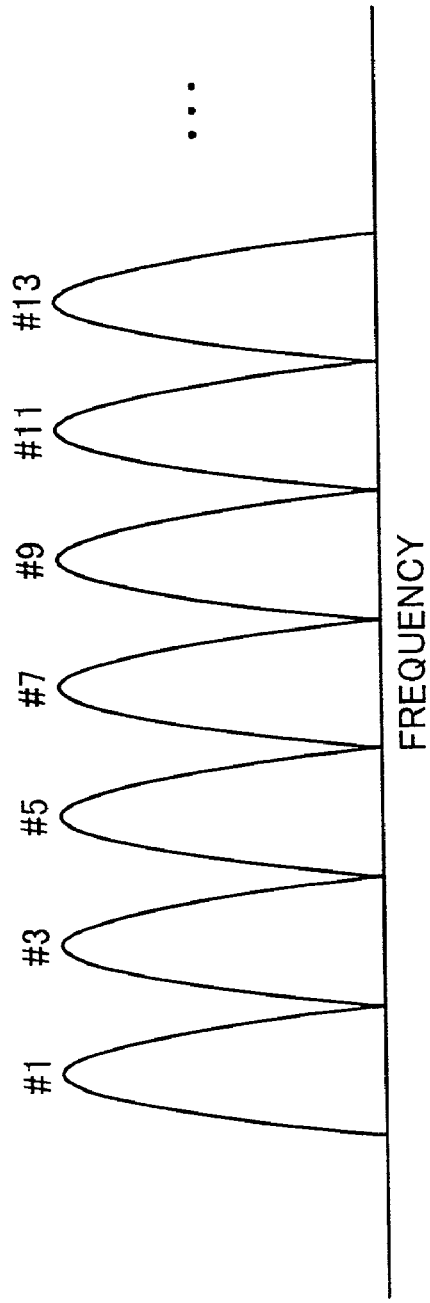
FIG. 3A is a schematic view illustrating one example of arrangement of subcarriers selected with respect to a branch 1 at the base station apparatus having the OFDM communication apparatus that performs transmission diversity.
FIG. 3B is a schematic view illustrating one example of arrangement of subcarriers selected with respect to a branch 2 at the base station apparatus having the OFDM communication apparatus that performs transmission diversity.
Figure 3:
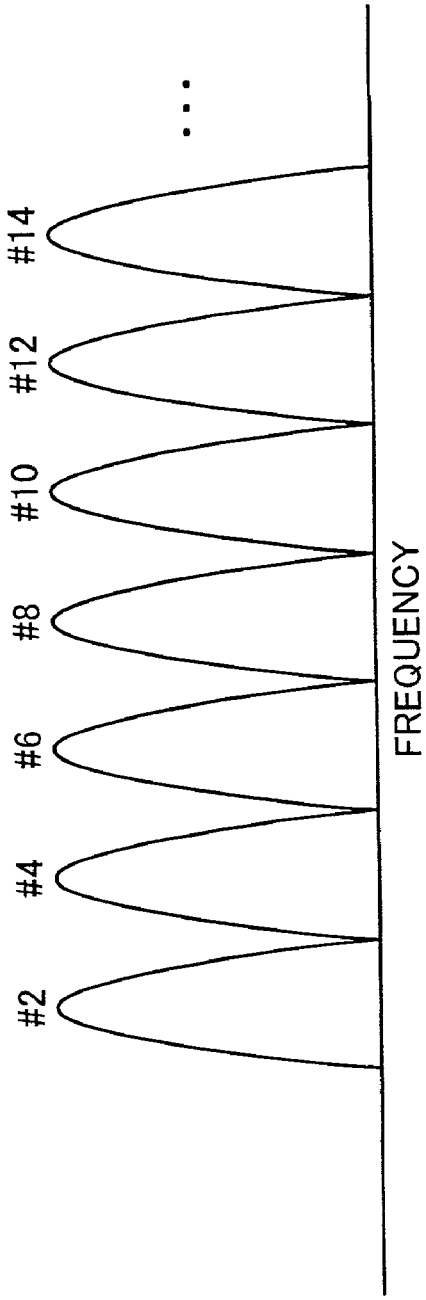

The first transmitting subcarrier selecting section 103 selects subcarriers to be fixedly transmitted for each branch. For example, as subcarriers to be transmitted with respect to the branch 1, odd-numbered subcarriers are fixedly selected as illustrated in FIG. 3A. Moreover, as subcarriers to be transmitted with respect to the branch 2, even-numbered subcarriers are fixedly selected as illustrated in FIG. 3B.

Thereafter, among the signals transmitted from coding/modulating section 102, only the signal to be arranged to the subcarriers to be transmitted with respect to the branch 1 is outputted to a selector 105 from the first transmitting subcarrier selecting section 103. Moreover, among the signals transmitted from coding/modulating section 102, only the signal to be arranged to the subcarriers to be transmitted with respect to the branch 2 is outputted to a selector 106 from the first transmitting subcarrier selecting section 103.

The second transmitting subcarrier selecting section 104 selects subcarriers to be fixedly transmitted for each branch. However, the subcarriers selected for each branch by the second transmitting subcarrier selecting section 104 are different from those selected for each branch by the first transmitting subcarrier selecting section 103.

Figure 6:
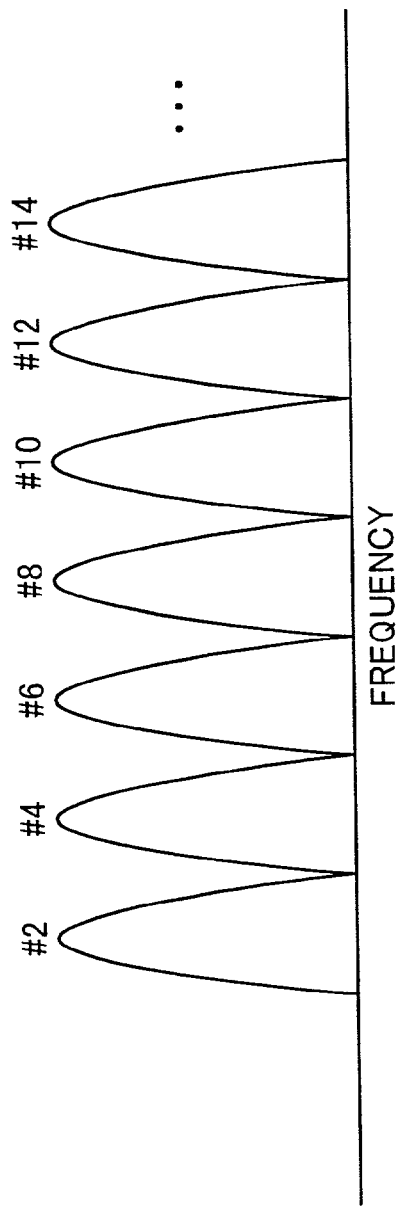
FIG. 6A is a schematic view illustrating one example of arrangement of subcarriers selected at a retransmitting time with respect to a branch 1 at the base station apparatus having the OFDM communication apparatus that performs transmission diversity according to the above embodiment.
FIG. 6B is a schematic view illustrating one example of arrangement of subcarriers selected at a retransmitting time with respect to a branch 2 at the base station apparatus having the OFDM communication apparatus that performs transmission diversity according to the above embodiment.
Figure 6:
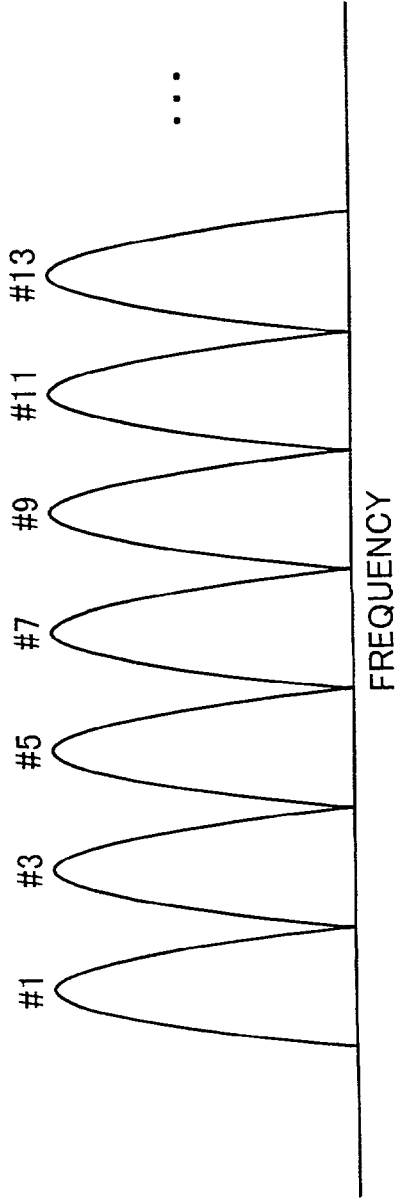

For example, as subcarriers to be transmitted with respect to the branch 1, odd-numbered subcarriers are fixedly selected as illustrated in FIG. 6A. Moreover, as subcarriers to be transmitted with respect to the branch 2, even-numbered subcarriers are fixedly selected as illustrated in FIG. 6B.

Thereafter, among the signals transmitted from coding/modulating section 102, only the signal to be arranged to the subcarriers to be transmitted with respect to the branch 1 is outputted to the selector 105 from the second transmitting subcarrier selecting section 104. Moreover, among the signals transmitted from coding/modulating section 102, only the signal to be arranged to the subcarriers to be transmitted with respect to the branch 2 is outputted to the selector 106 from the second transmitting subcarrier selecting section 104.

At the selector 105 and selector 106, the signal outputted from either the first transmitting subcarrier selecting section 103 or the second transmitting subcarrier selecting section 104 is outputted to the IFFT section in accordance with control by the retransmission control section 101.

More specifically, in accordance with the number of retransmissions of transmitting signal (packet) which will be transmitted from the retransmission control section 101, namely, whether the transmitting signal which will be transmitted from the retransmission control section 101 is one that will be transmitted for the first time or one that will be retransmitted, the retransmission control section 101 outputs a control signal, which indicates which signal from the first transmitting subcarrier selecting section 103 or the second transmitting subcarrier selecting section 104 should be outputted to the IFFT section, to the selector 105 and selector 106, respectively.

According to this embodiment, the control signal outputted from the retransmission control section 101 is set so that;

from selectors 105 and 106 to the IFFT section, the signal from the first transmitting subcarrier selecting section 103 is outputted, in the case where the transmitting signal which will be transmitted from the retransmission control section 101 is one that will be transmitted for the first time, from selectors 105 and 106 to the IFFT section, the signal from the second transmitting subcarrier selecting section 104 is outputted, in the case where the transmitting signal which will be transmitted from the transmission control section 101 is one that will be retransmitted.

In accordance with the aforementioned control signal, the signal to be arranged to the subcarriers to be transmitted with respect to the branch 1 is outputted to an IFFT section 107 from the selector 105. Also, the signal to be arranged to the subcarriers to be transmitted with respect to the branch 2 is outputted to an IFFT section 108 from the selector 106.

The signals outputted from the selector 105 and selector 106 are subjected to IFFT processing by the IFFT section 107 and IFFT section 108, thereafter they are transmitted to the mobile station apparatus via the antenna 109 and antenna 110, respectively.

Herein, the following will explain how the state of the signal received by the mobile station apparatus is changed at the base station apparatus when the subcarriers to be transmitted for each branch are changed at the first transmitting time of a certain transmitting signal and the retransmitting time.

Figure 4:
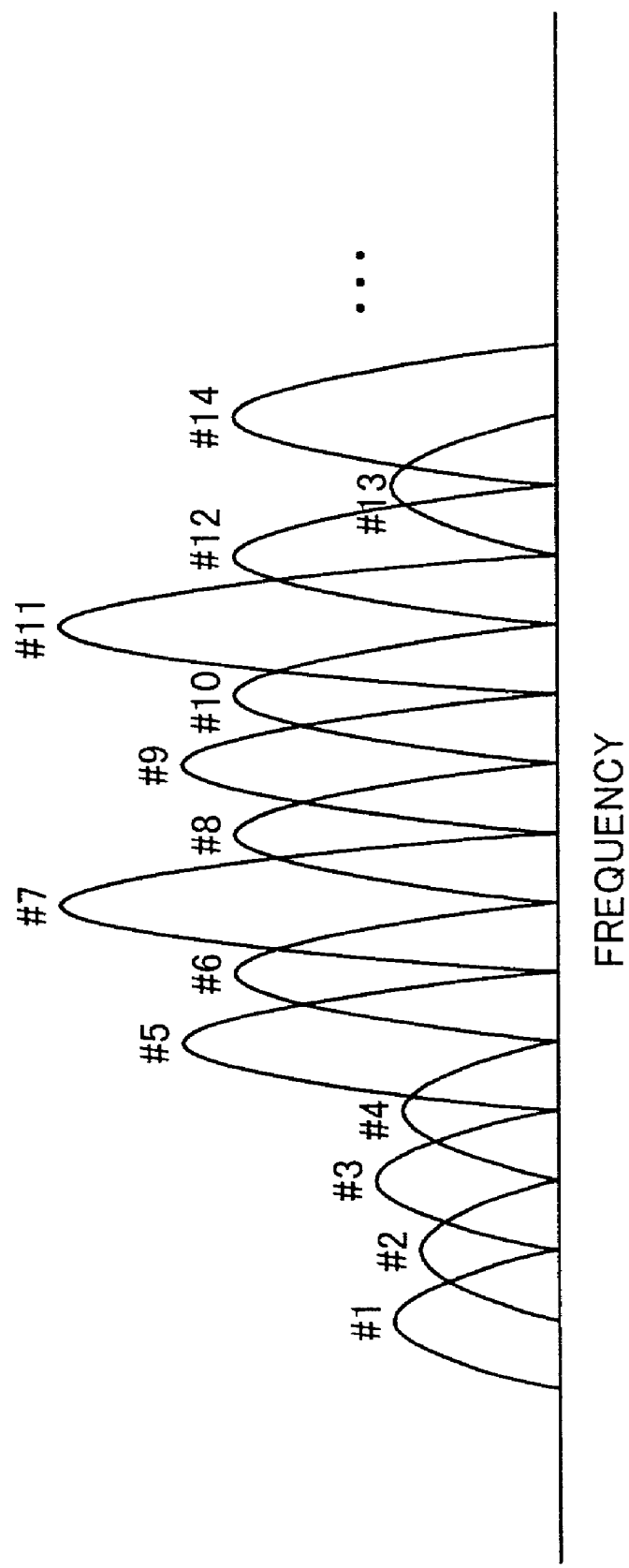
FIG. 4 is a schematic view illustrating one example of arrangement of subcarriers with respect to a signal received by the mobile station apparatus that performs radio communication with the conventional base station apparatus of FIG. 1.

In the case where a certain specific packet is received for the first time by the mobile station apparatus, when the channel state is as illustrated in FIG. 4, the signals, which are subjected to FFT processing at the mobile station apparatus, are those extracted from the respective subcarriers on the time series in order of subcarriers 1, 2, 3, 4 . . . Regarding the signals thus extracted, the quality of the signals arranged in the respective subcarriers 1 to 4 becomes worse, resulting in signals where errors intensively occur for a certain specific time.

On the other hand, at the time of retransmitting the above specific packet, the base station apparatus makes the subcarriers to be transmitted for each branch different from those at the first transmitting time with respect to the above specific packet as mentioned above. For this reason, the channel used when the base station apparatus transmits the specific packet for the first time and the channel used when retransmitting it are independent of each other, that is, different from each other.

Figure 7:
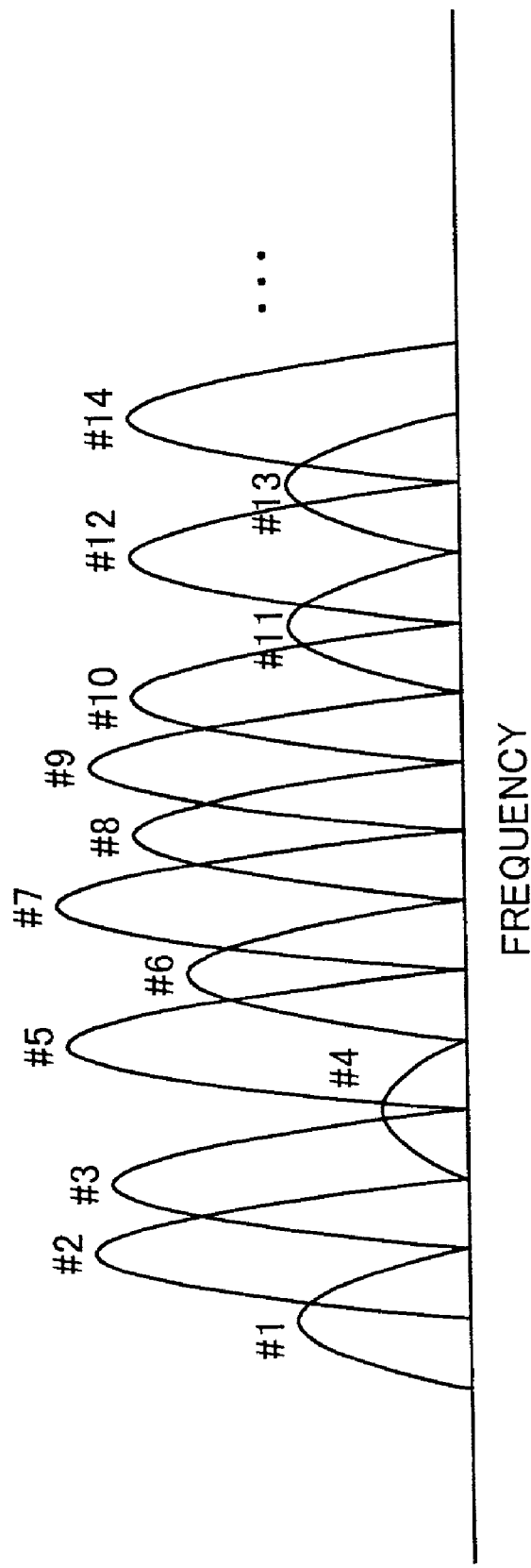
FIG. 7 is a schematic view illustrating one example of arrangement of subcarriers with respect to a signal received by the mobile station apparatus that performs radio communication with the base station apparatus having the OFDM communication apparatus that performs transmission diversity according to the above embodiment.

For this reason, in the case where the specific packet is retransmitted by the mobile station apparatus, there is a high possibility that the channel condition will be different from the channel state when the specific packet is received for the first time as illustrated in FIG. 7. In this case, as is obvious from FIG. 7, the signals subjected to FFT processing at the mobile station apparatus results in a signal having a low possibility that errors will intensively occur for a certain specific time in low-quality signals.

Accordingly, even in the case where the channel used when the base station apparatus transmits the specific packet for the first time and the channel used when retransmitting it are little changed, possibility that an error will occur in the packet retransmitted by the base station is greatly reduced. Namely, in the above case, it is possible to prevent the problem in which errors continuously occur in the certain specific packet.

Thus, according to this embodiment, the subcarriers to be transmitted for each branch are changed in the case of transmitting the certain specific packet for the first time from the base station apparatus and the case of retransmitting it, so the signals which are arranged to the subcarriers and transmitted from each branch, are different from each other in each case. This makes the channel states in the respective case independent of each other, so that probability that errors will continuously occur in the same packet can be reduced. Accordingly, in the case where an error occurs in a certain specific packet, it is possible to reduce time required for receiving the specific packet without any errors.

The above embodiment has explained the case in which two kinds of combinations to select subcarriers to be transmitted. However, the present invention is not limited to the above case, and the present invention is applicable to a case in which the number of combinations to select subcarriers to be transmitted is increased. The present invention is also applicable to a case in which combinations to select subcarriers to be transmitted is arbitrarily set.

Moreover, the present invention is also applicable to a case in which combinations to select subcarriers to be transmitted is independently set for each unit frame. This makes it possible to change the channel state during the reception of a certain packet and to reduce the possibility that errors will continuously occur in the same packet without fail.

The above embodiment has explained the case in which the subcarriers to be transmitted for each branch are changed in accordance with the number of retransmissions of a certain packet. However, the present invention is not limited to this, and it is applicable to a case in which the combinations of subcarriers to be transmitted for each branch are changed in accordance with various conditions of such as a channel quality, and the like.

Furthermore, the OFDM communication apparatus that performs transmission diversity according to the embodiment of the present invention is mountable on a communication terminal apparatus and a base station apparatus in a digital mobile communication system.

① An OFDM communication apparatus of the present invention comprises subcarrier selecting means for selecting subcarriers to be transmitted from a given branch in accordance with the number of retransmissions of transmitting signals; and transmitting means for arranging signals transmitting from the given branch among the transmitting signals to the selected subcarriers to perform IFFT processing.

According to the above configuration, the subcarriers to be transmitted for each branch are changed in the case of transmitting the certain transmitting signal for the first time and the case of retransmitting it. For this reason, in the case where an error occurs in a certain specific transmitting signal, it is possible to reduce time required for receiving the specific transmitting signal without any errors.

② In the OFDM communication apparatus of the present invention, the subcarrier selecting means selects unique subcarriers for each unit frame.

According to the above configuration, since the channel state can be changed while a certain transmitting signal is received, it is possible to further reduce the probability that errors will continuously occur in the same transmitting signal without fail.

③ A communication terminal apparatus of the present invention has any one of the above-mentioned OFDM communication apparatuses.

④ A base station apparatus of the present invention has any one of the above-mentioned OFDM communication apparatuses.

According to the above configuration, there can be provided the communication terminal apparatus and the base station apparatus that is capable of reducing time required for receiving a specific transmitting signal without any errors in the case where an error occurs in the certain specific transmitting signal.

⑤ An OFDM communication method of the present invention comprises the subcarrier selecting step of selecting subcarriers to be transmitted from a given branch in accordance with the number of retransmissions of transmitting signals; and the transmitting step of arranging signals transmitting from the given branch among the transmitting signals to the selected subcarriers to perform TIFFT processing.

According to the above method, the subcarriers to be transmitted for each branch are changed in the case of transmitting the certain transmitting signal for the first time and the case of retransmitting it. For this reason, in the case where an error occurs in a certain specific transmitting signal, it is possible to reduce time required for receiving the specific transmitting signal without any errors.

As explained above, according to the present invention, since the subcarriers to be transmitted are changed for each branch in accordance with the number of retransmissions of transmitting signals, it is possible to provide the OFDM communication apparatus that performs transmission diversity capable of reducing probability that errors continuously occur in the same transmitting signal.

This application is based on the Japanese Patent Application No. HEI 11-240878 filed on Aug. 27, 1999, entire content of which is expressly incorporated by reference herein.

INDUSTRIAL APPLICABILITY

The present invention is suitable for use in the field of the OFDM communication apparatus that performs retransmission control.

What is claimed is:

1. An OFDM communication apparatus having a plurality of transmitters that transmit or retransmit a plurality of modulated signals, each corresponding to one of a plurality of subcarriers, simultaneously from a plurality of branches, each transmitter having one of the plurality of branches as a corresponding branch and transmits or retransmits one of the modulated signals arranged on one of the plurality of subcarriers from the corresponding branch, the apparatus comprising:

a modulator that modulates a plurality of signals to generate the plurality of modulated signals; and a selector that: (1) selects, with respect to a first branch and a second branch of the plurality of branches, a first modulated signal to be arranged on a first subcarrier of the plurality of subcarriers from among the plurality modulated signals, the first branch and the second branch being different from each other, (2) outputs the first modulated signal to a first transmitter of the plurality of transmitters in a case of transmitting the plurality of modulated signals, the first transmitter having the first branch as the corresponding branch, and (3) outputs the first modulated signal to a second transmitter of the plurality of transmitters in a case of retransmitting the plurality of modulated signals, the second transmitter having the second branch as the corresponding branch.

2. The OFDM communication apparatus according to claim 1, wherein the selector comprises:

a first selector that outputs the first modulated signal with respect to the first branch in both cases of transmitting and retransmitting the plurality of modulated signals;

a second selector that outputs the first modulated signal with respect to the second branch in both cases of transmitting and retransmitting the plurality of modulated signals; and a third selector that outputs, among outputs of the first selector and the second selector, the outputs of the first selector to the first transmitter in the case of transmitting the plurality of modulated signals, and outputs, among the outputs of the first selector and the second selector, the outputs of the second selector to the second transmitter in the case of retransmitting the plurality of modulated signals.

3. The OFDM communication terminal apparatus according to claim 2, wherein the first selector and the second selector output a set of modulated signals as the first modulated signal, the set of modulated signals corresponding to a set of subcarriers, the set of subcarriers consisting of either one of odd-numbered subcarriers and even-numbered subcarriers.

4. A communication terminal apparatus comprising the OFDM communication apparatus according to claim 1.

5. A base station apparatus comprising the OFDM communication apparatus according to claim 1.

6. An OFDM communication method to be used in an OFDM communication apparatus having a-plurality of transmitters that transmit or retransmit a plurality of modulated signals, each corresponding to one of a plurality of subcarriers, simultaneously from a plurality of branches, each transmitter having one of the plurality of branches as a corresponding branch and transmits or retransmits one of the modulated signals arranged on one of the plurality of subcarriers from the corresponding branch, the method comprising:

modulating a plurality of signals to generate the plurality of modulated signals;

selecting, with respect to a first branch and a second branch of the plurality of branches, a first modulated signal to be arranged on a first subcarrier of the plurality of subcarriers from among the plurality of modulated signals, the first branch and the second branch being different from each other;

outputting the first modulated signal to a first transmitter of the plurality of transmitters in a case of transmitting the plurality of modulated signals, the first transmitter having the first branch as the corresponding branch; and outputting the first modulated signal to a second transmitter of the plurality transmitters in a case of retransmitting the plurality of modulated signals, the second transmitter having the second branch as the corresponding branch.

* * * * *